Oct. 15, 1929.　　　　N. SKILLMAN　　　　1,731,988
MACHINE FOR FORMING BUSHINGS
Filed April 26, 1926
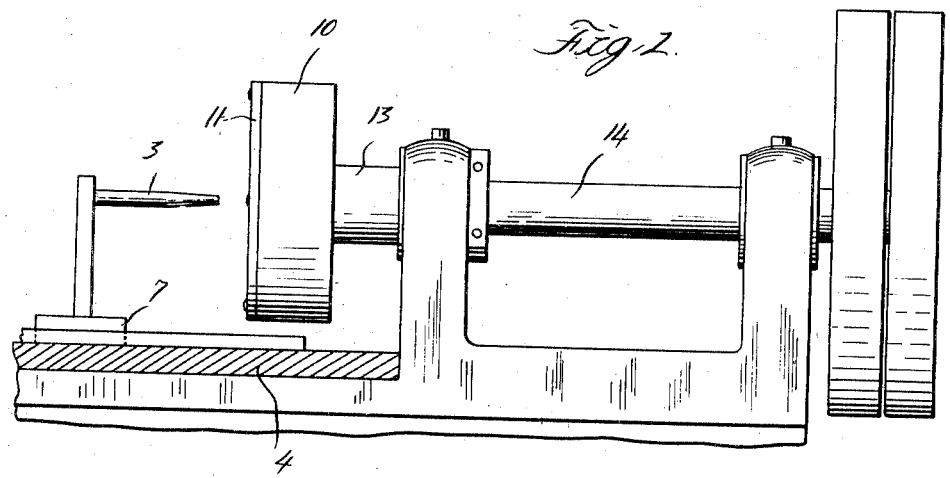
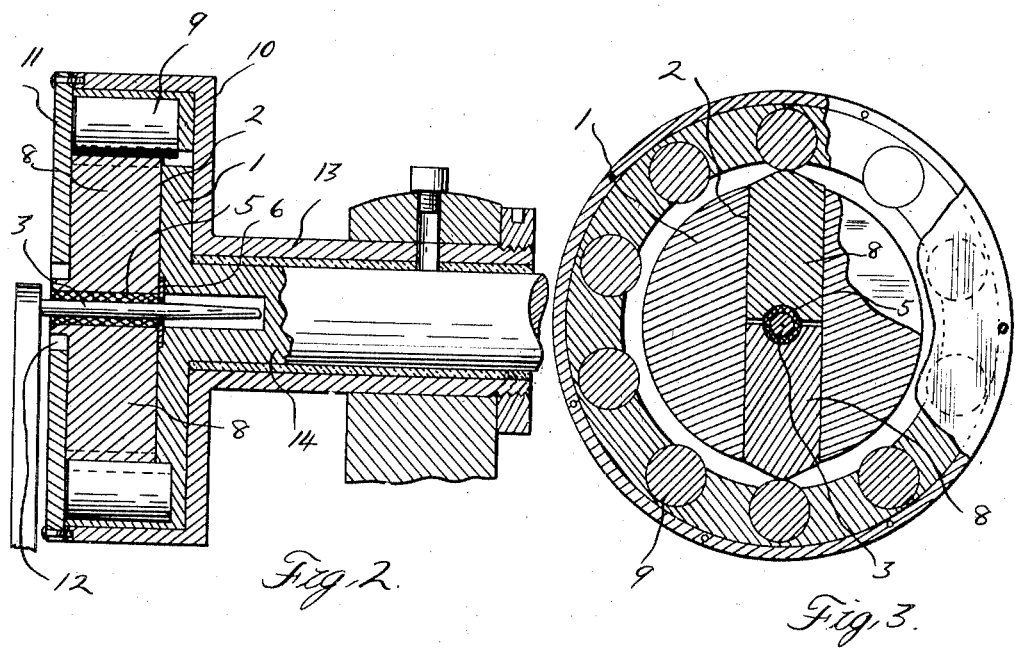
Inventor
Newton Skillman
By
Attorneys Patented Oct. 15, 1929

1,731,988

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

MACHINE FOR FORMING BUSHINGS

Application filed April 26, 1926. Serial No. 104,737.

The invention relates to machines for forming bushings and refers more particularly to machines for sizing fibrous bushings. One of the objects of the invention is to provide a machine capable of rapidly sizing a fibrous bushing. Another object is to provide a machine which has parts operating upon the bushing to size the same with both an expanding and contracting pressure. Further objects of the invention reside in the novel features of construction and combinations and arrangements of parts as more fully hereinafter set forth.

In the drawings:—

Figure 1 is a side elevation of a machine embodying my invention;

Figure 2 is a vertical section through a portion thereof;

Figure 3 is a transverse section partly in elevation through Figure 2.

I have, as shown in the present instance, adapted a small rotary punch press for sizing the fibrous bushings which are preferably formed of woven material and impregnated with lubricant. The machine is designed to apply both expanding and contracting pressure upon the bushings to highly compress the material and produce a bushing having predetermined internal and external dimensions.

In detail 1 is a rotary head having the diametrically extending slot 2. 3 is an arbor in axial alignment with the head and mounted upon the bed 4 of the machine. This arbor supports the bushing 5 which during the operation of the machine is located within the head and has its inner end engageable with the washer 6, this latter being concentrically arranged within the head beyond the diametrical slot. For expanding the bushing and forming the same with a predetermined internal diameter, the arbor has a tapered inner end portion and an adjacent cylindrical portion, the latter having a predetermined diameter. Also the arbor is movable longitudinally or axially relative to the head to first expand the bushing and then hold the same to its predetermined internal diameter. As shown, this arbor is mounted upon the support 7 which is slidably mounted in a suitable guideway upon the bed 4.

For operating upon the bushing with contracting pressure to compress the fibres into close, intimate contact and to also reduce the external dimension of the bushing to predetermined diameter, I have provided the cooperating compressing jaws 8, which are slidable within the diametrical slot 2 and located on opposite sides of the bushing. These jaws have their inner ends shaped to form when together an opening having a diameter equal to the predetermined final external diameter of the bushing. The outer ends of the jaws extend radially outward beyond the head 1 and upon rotation of the head are engageable with the series of rolls 9 which are journaled in the bearing roll carried by the stationary casing 10 and extend transversely of the jaws. These rolls are arranged in pairs with one roll diametrically opposite another so that both jaws 8 are simultaneously moved inwardly. 11 is a cover plate which cooperates with the casing 10 to house the head 1, jaws 8 and rolls 9. The cover plate is provided with the central aperture 12 for allowing passage of the arbor 3 therethrough and the casing 10 is provided with the central hub 13 which supports the casing and within which the shank 14 of the head 1 is journaled.

In operation, the bushing 3 is placed upon the arbor with the arbor in outer position and the bushing upon its inner tapered end. The head 1 is rotated thereby bodily rotating the compressing jaws 8 about the bushing and bringing the outer ends of the jaws into engagement with the rolls 9, which compel the jaws to move radially inward toward the arbor to compress the bushing and contract the same to final predetermined external diameter. The arbor 3 is moved longitudinally or axially inward to gradually expand the bushing to final predetermined internal diameter. Inasmuch as the jaws are intermittently moved inwardly to compress the bushing at a very fast rate, the bushing may be compressed and sized very quickly.

What I claim as my invention is:

1. The combination with a non-rotatable arbor adapted to extend through a fibrous bushing, of cooperating jaws adapted to engage with the bushing to compress the same, means adapted for bodily rotating said jaws about the bushing and compelling said jaws to compress the bushing upon said arbor and means adapted for moving said arbor longitudinally relative to the bushing during compressing operation, to expand the bushing.

2. In a machine for forming bushings, the combination with a non-rotatable arbor adapted to extend through a bushing of a rotary head, cooperating jaws adapted to engage with the bushing to compress the same, said jaws being slidable transversely of said head and rotatable therewith and means dependent upon the rotation of said head and jaws and adapted for compelling said jaws to move inwardly toward said arbor to compress the bushing, means located in the rotary head adapted to keep the inner end of the bushing flush with the inner face of the cooperating jaws and which allow the arbor to project into the shank of the rotary head.

3. The combination with an arbor adapted to extend through a fibrous bushing, of an axially aligned rotary head provided with a diametrically extending slot, cooperating jaws in the head and on opposite sides of the bushing and means engageable with said jaws upon rotation of said head and jaws for moving said jaws inwardly toward said arbor to compress the bushing, means for moving the arbor longitudinaly relative to the bushing during the compressing operation of the jaws whereby the bushing is extended.

4. The combination with a tapered arbor adapted to extend through and project beyond a fibrous bushing, of an axially aligned rotary head provided with a diametrically extending slot, cooperating jaws slidable in said slot and on opposite sides of the bushing, said jaws adapted to engage at their inner ends with the bushing and having their outer ends extending radially outward beyond said head, means intermittently engageable with the outer ends of said jaws upon rotation of said head and jaws for compelling said jaws to move inwardly toward said arbor and adapted to compress the bushing and means for longitudinally moving said arbor longitudinally of the bushing during the compressing operation to expand the same.

5. In a machine for forming bushings, the combination with means adapted to engage a bushing to expand the same, of means adapted to engage with bushing to contract the same while the aforesaid means expand the bushing, and means adapted to rotate said second-mentioned means about the bushing and intermittently compelling said second-mentioned means to contract the bushing.

6. The combination with an arbor adapted to extend through a fibrous bushing, of an auxiliary aligned rotary head provided with a diametrically extending slot, cooperating jaws slidable in said slot and on opposite sides of the bushing, said jaws adapted to engage at their inner ends with the bushing and having their outer ends extending radially outward beyond said head, apertured means which prevent the bushing from projecting beyond the inner face of the cooperating jaws, a stationary casing surrounding said rotary head and rolls journalled in said casing at spaced intervals for intermittently engaging the outer ends of the said jaws upon rotation of said head and jaws for compelling said jaws to move inwardly toward said arbor to compress the bushing.

7. The combination with an arbor adapted to extend through a fibrous bushing, of an auxiliary aligned rotary head provided with a diametrically extending slot, cooperating jaws slidable in said slot and on opposite sides of the bushing, said jaws being engageable at their inner ends with the bushing and having their outer ends extending radially outward beyond said head, a washer concentrically arranged within the head beyond the slot and adapted to engage with the inner end of the bushing and a plurality of pairs of rolls journalled in said casing, each roll being diametrically opposite its corresponding roll so as to engage the outer end portion of one of the jaws simultaneously with the engagement of its corresponding roll with the end portion of the other jaw upon rotation of said head and jaws, for compelling said jaws to move inwardly toward said arbor to compress the bushing.

8. In a machine for forming bushings, the combination with a supporting base, a rotary shaft supported upon said base, of a rotary head mounted upon one end of said shaft, an arbor adapted to expand a bushing and slidably mounted on said base and extending through the bushing, cooperating jaws adapted to engage the bushing to compress the same, said jaws being slidable transversely of said head and rotatable therewith and means dependent upon the rotation of said heads and jaws for compelling said jaws to move inwardly toward said arbor to compress the bushing, apertured means concentrically arranged within the rotary head beyond the slot and adapted to engage the inner end of the bushing whereby the inner end of the bushing is kept flush with the inner face of the cooperating jaws.

9. In a machine for forming bushings, the combination of a non-rotatable longitudinally slidable and tapered arbor adapted to move through and to expand a bushing to size simultaneously with the compression sizing operation, of a rotary head mounted to rotate about an axis in alignment with said arbor and adapted to receive said bushing and arbor, and jaws mounted within said rotatable head and adapted to be radially movable only against said bushing to compress the same against the arbor.

10. The method of sizing a fabric bushing, or the like, which comprises simultaneously applying an internal expanding pressure to expand the bushing to a predetermined internal diameter and an external contracting pressure to contract the bushing to a predetermined external diameter.

11. The method of sizing a fabric bushing, or the like, which comprises simultaneously applying an internal expanding pressure to expand the bushing to a predetermined internal diameter and an external intermittent contracting pressure to gradually contract the bushing to a predetermined external diameter.

In testimony whereof I affix my signature.

NEWTON SKILLMAN.